United States Patent
Yamaji et al.

(10) Patent No.: US 8,991,900 B2
(45) Date of Patent: Mar. 31, 2015

(54) VEHICLE SKELETON MEMBER

(71) Applicant: Teijin Limited, Osaka-shi, Osaka (JP)

(72) Inventors: Tadashi Yamaji, Matsuyama (JP);
Yutaka Yagi, Matsuyama (JP);
Masatomo Teshima, Matsuyama (JP);
Koji Suzuki, Matsuyama (JP); Toru Kaneko, Matsuyama (JP)

(73) Assignee: Teijin Limited, Osaka-shi, Osaka (JP)

(*) Notice: Subject to any disclaimer, the term of this patent is extended or adjusted under 35 U.S.C. 154(b) by 0 days.

(21) Appl. No.: 13/957,465

(22) Filed: Aug. 2, 2013

(65) Prior Publication Data

US 2013/0313862 A1 Nov. 28, 2013

Related U.S. Application Data

(63) Continuation of application No. PCT/JP2012/052796, filed on Feb. 1, 2012.

(30) Foreign Application Priority Data

Feb. 3, 2011 (JP) .................. 2011-021651

(51) Int. Cl.
*B62D 29/04* (2006.01)
*B62D 25/02* (2006.01)
*B62D 25/04* (2006.01)
(Continued)

(52) U.S. Cl.
CPC ............. *B62D 29/04* (2013.01); *B62D 25/025* (2013.01); *B62D 25/04* (2013.01); *B62D 25/06* (2013.01); *B62D 25/2036* (2013.01); *B62D 29/041* (2013.01); *B62D 29/046* (2013.01); *B62D 29/048* (2013.01); *B62D 29/043* (2013.01);
(Continued)

(58) Field of Classification Search
CPC .... B62D 29/04; B62D 29/041; B62D 29/043; B62D 29/046
USPC .................. 296/181.2, 901.01, 900
See application file for complete search history.

(56) References Cited

U.S. PATENT DOCUMENTS 4,705,716 A * 11/1987 Tang .......................... 442/224
5,108,678 A   4/1992 Hirasaka et al.
(Continued)

FOREIGN PATENT DOCUMENTS

JP    S64-081826    3/1989
JP    03-047740     2/1991
(Continued)

OTHER PUBLICATIONS

Machine Translation of JP-2006-51813, printed from the JPO website, Oct. 24, 2014.*

(Continued)

*Primary Examiner* — Jason S Morrow
(74) *Attorney, Agent, or Firm* — Banner & Witcoff, Ltd.

(57) ABSTRACT

There is provided a vehicle skeleton member including a composite material of a thermoplastic resin and a carbon fiber, wherein the composite material is a unidirectional carbon-fiber composite material (A) that a form of the carbon fiber in the composite material is a continuous fiber aligned in one direction and/or a random carbon-fiber composite material (B) that a form of the carbon fiber in the composite material is a discontinuous fiber arranged two-dimensionally randomly.

8 Claims, 8 Drawing Sheets

(51) Int. Cl.
*B62D 25/06* (2006.01)
*B62D 25/20* (2006.01)
*B62D 23/00* (2006.01)

(52) U.S. Cl.
CPC ......... *B62D 23/00* (2013.01); *Y10S 296/90101* (2013.01); *Y10S 296/90* (2013.01)
USPC .................... 296/181.2; 296/901.01; 296/900

(56) References Cited

U.S. PATENT DOCUMENTS

| | | | |
|---|---|---|---|
| 6,206,458 B1 * | 3/2001 | Schroeder et al. | 296/203.01 |
| 6,854,791 B1 | 2/2005 | Jaggi | |
| 7,059,665 B2 * | 6/2006 | Murai et al. | 296/181.2 |
| 8,276,975 B2 * | 10/2012 | Kimoto et al. | 296/187.04 |
| 2005/0173010 A1 | 8/2005 | Schwan et al. | 138/121 |
| 2006/0163910 A1 * | 7/2006 | Behr | 296/181.2 |
| 2009/0179461 A1 * | 7/2009 | Fuchs et al. | 296/204 |
| 2011/0101734 A1 * | 5/2011 | Gunther et al. | 296/193.06 |
| 2013/0313860 A1 * | 11/2013 | Yamaji et al. | 296/193.07 |

FOREIGN PATENT DOCUMENTS

| | | |
|---|---|---|
| JP | 09-309171 | 2/1997 |
| JP | 2000-038157 A | 2/2000 |
| JP | 2000-102982 A | 4/2000 |
| JP | 2001-010542 A | 1/2001 |
| JP | 2006-051813 A | 2/2006 |
| JP | 2007-253573 A | 10/2007 |
| JP | 2008-030609 A | 2/2008 |
| JP | 2008-037316 A | 2/2008 |
| JP | 2008-068720 A | 3/2008 |
| JP | 2008-114633 A | 5/2008 |
| JP | 2009-137062 A | 6/2009 |
| JP | 2010-137639 A | 6/2010 |
| JP | 2010-155403 A | 7/2010 |
| JP | 2010-235779 A | 10/2010 |
| WO | 0128845 A1 | 4/2001 |
| WO | 2006117395 A1 | 11/2006 |

OTHER PUBLICATIONS

Machine Translation of JP-2000-102982, printed from the JPO website, Oct. 24, 2014.*
International Search Report issued in corresponding Japanese Patent Application No. PCT/JP2012/052796 mailed May 1, 2012.
Written Opinion of the International Searching Authority received in corresponding Japanese Application No. PCT/JP2012/052796 issued on Jan. 5, 2012.
European Office Action mailed Mar. 19, 2014 for related EP Application No. 12742201.2-1757.
Supplemental European Search Report for EP 12742201.2-1757 mailed Mar. 6, 2014.
Aug. 5, 2014—(JP) Office Action—App 2012556005—Concise Explanation.
Dec. 18, 2014 (JP) Third Party Observation—App 2012-556005—Eng tran.
Dec. 9, 2014—(EP) Office Action—App 12742201.2.

* cited by examiner

VEHICLE SKELETON MEMBER

CROSS REFERENCE TO RELATED APPLICATION

This is a continuation of International Application No. PCT/JP2012/052796 filed on Feb. 1, 2012, and claims priority from Japanese Patent Application No. 2011-021651, filed on Feb. 3, 2011, the entire disclosures of which are incorporated herein by reference.

TECHNICAL FIELD

The present invention relates to a vehicle skeleton member having a composite material of a thermoplastic resin and a carbon fiber.

BACKGROUND ART

Currently, reduction of body weight has been required of automobiles for lowering environmental burdens with satisfying collision safety standards. For achieving both of such safety and weight-saving, with regard to a vehicle skeleton, there has been widely used a method of increasing body rigidity by spot-welding a reinforcing component to an appropriate part of a steel-made structural material subjected to sheet metal working For achieving further remarkable weight-saving, it has been attempted to apply a carbon fiber composite material that is a more light-weight material to a material for a vehicle skeleton member, instead of steel. However, since the vehicle skeleton member has a complex shape or is extremely large, it is necessary to use an expensive carbon fiber fabric for producing such a member having the carbon fiber composite material. Furthermore, since a shaping technology for a carbon fiber composite material whose matrix component is a thermoplastic resin is not sufficiently established, it is also necessary to perform shaping using a hand lay-up or autoclave method that is low in productivity with the use of a carbon fiber composite material containing a thermosetting resin as a matrix component. As a result, the vehicle skeleton member made of the carbon fiber composite material is very disadvantageous in view of productivity and economical efficiency and thus wide use thereof has been necessarily extremely limited.

Recently, although an improvement in productivity using RTM method (Resin Transfer Molding method) is attempted (for example, see Patent Document 1), length of the time for curing reaction of the thermosetting resin used as a matrix is a serious difficulty in productivity and thus the method has not yet been accomplished as a technology applicable to widely used vehicles.

As a means for improving the productivity of a composite material of a resin and a reinforcing fiber, a thermoplastic composite material using a thermoplastic resin as a matrix component has been developed. Such a thermoplastic composite material enables impartment of a shape within a short tact time by stamping molding after the material is heated and plasticized and, since pressing pressure required for stamping is lower than that for stamping molding of a steel, integral molding is applicable in the case of such a size as a floor for a vehicle. Moreover, it is possible to produce a thermoplastic composite material in which a reinforcing fiber having a form of continuous fiber is aligned in one direction by a pultrusion method.

However, as mentioned above, a vehicle skeleton member is difficult to shape since it has a complex shape and is extremely large and also required levels for safety and strength are extremely high, so that practical one as a vehicle skeleton member having a composite material of a thermoplastic resin and a reinforcing fiber has not been obtained (Patent Document 1) JP-A-2008-68720

DISCLOSURE OF THE INVENTION

Problems that the Invention is to Solve

An object of the present invention is to provide a vehicle skeleton member having a composite material of a thermoplastic resin and a carbon fiber, and when a vehicle skeleton is constituted using the vehicle skeleton member, a vehicle structure having a sufficient strength is obtained and a substantial weight-saving of a vehicle body is achieved.

Means for Solving the Problems

Upon providing the vehicle skeleton member having a composite material of a thermoplastic resin and a carbon fiber, the present inventors have found that the above problem can be solved by using a composite material having a form in which a continuous carbon fiber is arranged in one direction in a thermoplastic resin, a composite material having a form in which a discontinuous carbon fiber is two-dimensionally randomly oriented in a thermoplastic resin, or a composite material obtained by further combining these ones, for example, layering them. Namely, the invention is a vehicle skeleton member having a composite material of a thermoplastic resin and a carbon fiber, wherein the composite material is a unidirectional carbon-fiber composite material (A) that the form of the carbon fiber in the composite material is continuous fibers aligned in one direction and/or a random carbon-fiber composite material (B) that the form of the carbon fiber in the composite material is a discontinuous fiber arranged two-dimensionally randomly. Further preferably, it is a vehicle skeleton member partially having a layer body, especially a sandwiched member as a composite material.

Advantage of the Invention

By constituting a vehicle skeleton using a vehicle skeleton member having a composite material of a thermoplastic resin and a carbon fiber, a vehicle structure is enabled to have a sufficient strength and a substantial weight-saving of a vehicle body is achieved.

Moreover, according to the invention, a vehicle skeleton member further excellent in strength and light in weight and applicable to a complex shape can be provided through layering or further formation of a sandwiched member with appropriately selecting composite materials different in the form of the carbon fiber and preferably combining them.

DESCRIPTION OF REFERENCE NUMERALS AND SIGNS

Figure 1:
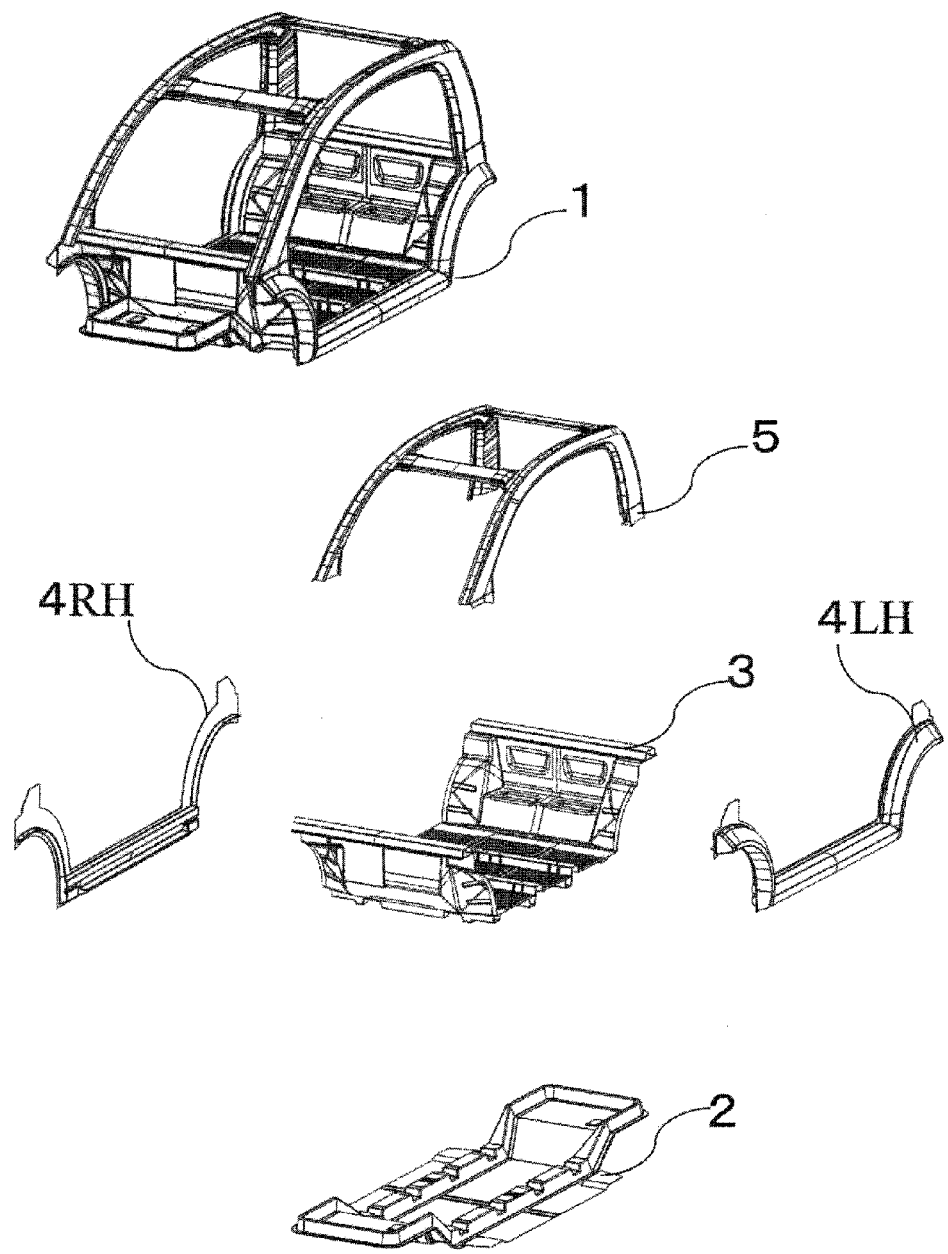
FIG. 1 is a schematic view of a vehicle skeleton member.

1 Vehicle skeleton member
2 Underfloor structural component
(2a, 2b, 2c: components)
3 Upperfloor structural component
(3a, 3b, 3c, 3d, 3e, 3f, 3g: components)
4 Side sill structural component
(4RH: right component, 4LH: left component, 4RHa, 4RHb, 4RHc, 4LHa, 4LHb, 4LHc: components)
5 Vehicle body upper structural component (pillar•roof)
(5a, 5b, 5c, 5d, 5e: components)
(a) Portion using sandwiched material AB
(b) Portion using sandwiched material BC best mode for carrying out the invention The following will explain embodiments of the present invention in sequence.

<<Vehicle Skeleton Member of the Invention>>

The vehicle skeleton member of the invention is a vehicle skeleton member having a composite material of a thermoplastic resin and a carbon fiber, wherein the composite material is a unidirectional carbon-fiber composite material (A) that the form of the carbon fiber in the composite material is a continuous fibers aligned in one direction and/or a random carbon-fiber composite material (B) that the form of the carbon fiber in the composite material is a discontinuous fiber arranged two-dimensionally randomly.

Here, the vehicle skeleton member of the invention is a member constituting the body of an automobile. Preferable specific examples include one or more selected from the group consisting of floor structural components, side sill structural components, dashboard structural components, vehicle body upper structural components including a pillar, a roof, a roof rail, and the like, and complexes thereof, for example, one having a vehicle upper shape (an upper vehicle body), one having a vehicle lower shape (lower vehicle body), one having a vehicle skeleton shape obtained by assembling the above structural components, and the like. Preferred floor body structural components include one or more double-deck type components for floor structure selected from the group consisting of underfloor structural components, upperfloor structural components, and the like.

The vehicle skeleton member preferably contains one or more members having a composite material of a thermoplastic resin and a carbon fiber, and further contains a portion at which a plurality of the members having the composite material is joined. As methods for joining the members, known methods can be utilized, for examples, a method of using an adhesive agent, a method of mechanically fastening them with a bolt and a nut, and a method of joining them by heating and melting the thermoplastic resin that is a matrix component of the composite material. Of these, preferred is a method of joining them by heating and melting the thermoplastic resin that is a matrix component by vibration welding.

The vehicle skeleton member of the invention may have a member having a material other than a composite material, such as a metal or a ceramic, a glass fiber composite material, a composite material in which a matrix component is a thermosetting resin, or the like within a range that does not impair the object of the invention, in addition to the member having the composite material of a thermoplastic resin and a reinforcing fiber. However, from the viewpoint of weight-saving of a vehicle body, it is preferable that the ratio of the member having the composite material in the vehicle skeleton member is high. Specifically, the weight ratio of the member having the composite material in the vehicle skeleton member is preferably 50% or more and more preferably 80% or more and 100% or less.

[Carbon Fiber Composite Material]

The composite material constituting the vehicle skeleton member of the invention contains a thermoplastic resin and a carbon fiber. The weight ratio of the carbon fiber/thermoplastic resin in the composite material is preferably 20/80 to 80/20. More preferably, the ratio is 30/70 to 70/30. In either of the unidirectional carbon fiber composite material (A) and the random carbon fiber composite material (B) to be mentioned below, the carbon fiber contained therein preferably has an average fiber diameter of 3 to 12 μm.

The form of the carbon fiber in the composite material is one in which a continuous fiber is aligned in one direction (A) and/or one in which a discontinuous fiber is two-dimensionally randomly arranged (B), which are described in the following in detail.

The thermoplastic resin that is the matrix component of the composite material constituting the vehicle skeleton member of the invention includes polycarbonate resins, polyolefin resins, polyester resins, acrylic resins, polylactic acid, polyamide resins (aliphatic polyamide resins are also referred to as Nylon resins), ASA resins, ABS resins, polyether ketone resins, polyether imide resins, polyphenylene ether resins, polyphenylene oxide resins, polysulfone resins, polyether sulfone resins, polyether ether ketone resins, polyphenylene sulfide resins, polyamide imide resins, and compositions of two or more resins selected from these resins, but is not particularly limited. As the resin composition, preferred is at least one selected from the group consisting of compositions of polycarbonate resins and polyester resins, compositions of polycarbonate resins and ABS resins, compositions of polyphenylene ether resins and polyamide resins, compositions of polyamide resins and ABS resins, compositions of polyester resins and polyamide resins, and the like.

In the case where the vehicle skeleton member is a component for a floor structure or a component for a side sill structure, the thermoplastic resin in the composite material is preferably an aliphatic polyamide resin, and specifically, Nylon 6, Nylon 66, or the like may be exemplified.

In the case where the vehicle skeleton member is a component for a body upper structure, such as a pillar or a roof, a polyolefin may be also used as the thermoplastic resin in the composite material. As the polyolefin, one or more selected from the group consisting of polyethylene, polypropylene, and polystyrene may be preferably mentioned.

[Unidirectional Carbon-Fiber Composite Material (A)]

The following will describe the unidirectional carbon-fiber composite material (A) (hereinafter sometimes abbreviated as "unidirectional material A") in which a continuous fiber is aligned in one direction. The unidirectional carbon-fiber composite material (A) is used singly, preferably as a layer body obtained by layering it with the other composite material as mentioned below, or more preferably as a sandwiched member.

Here, the carbon fiber is a continuous fiber. In the invention, the continuous fiber refers to one having a fiber length of more than 100 mm. An upper limit of the fiber length of the continuous fiber is not specified but is sufficiently 15,000 mm or less in almost all vehicle skeleton members of the invention, is frequently sufficiently 5,000 mm or less, and is sufficiently 2,000 mm or less in quite a few cases. In the case of the continuous fiber, preferred is a sheet-shaped form of a woven or knitted fabric, a unidirectionally oriented sheet-shaped product of strands, a multi axial woven fabric, and the like, or a form of nonwoven fabric. In this regard, the multi axial woven fabric generally means a woven fabric in which one obtained by stacking a bundle of fiber-reinforced material aligned in one direction in a sheet form with changing the angle (multi axial woven fabric base material) is stitched with a stitching thread such as a Nylon thread, a polyester thread, or a glass fiber thread through the stacked body in a thickness direction between the front side and the reverse side of the stacked body along a surface direction, back and forth.

In the unidirectional carbon-fiber composite material (A), fiber orientation can be arbitrarily selected depending on a stress state generated at the portion to be applied. Specifically, the fiber orientation is preferably made coincident with the main direction on which main stress acts. Moreover, it is also possible to use unidirectional carbon-fiber composite materials (A) having different fiber orientation depending on the stress state generated at the portion to be applied. In this case, the each angle formed by each unidirectional carbon-fiber composite material (A) in each layer is preferably from 30 to 150°, more preferably from 60 to 120°, and still more preferably from 80 to 100°. As the portion to be applied, the material can be preferably used to one or more selected from the group consisting of floor structural components, side sill structural components, vehicle body upper structural components, and the like.

[Random Carbon-Fiber Composite Material (B)]

The following will describe the random carbon-fiber composite material (B) (hereinafter sometimes abbreviated as "random material B") in which a discontinuous fiber is two-dimensionally randomly arranged. The random carbon-fiber composite material (B) is used singly, preferably as a layer body obtained by layering it with the other composite material as mentioned below, or more preferably as a sandwiched member. The random carbon-fiber composite material (B) is preferably used singly at the portion where mechanical properties are required to be isotropic.

The "two-dimensionally randomly (oriented)" means a state that a discontinuous carbon fiber is two-dimensionally entangled and deposited with forming a pseudo plane and each carbon fiber is oriented in the pseudo plane, as seen in a deposit obtained by cutting and opening a carbon fiber bundles, and spraying them. For a plate-shaped sample of the random carbon-fiber composite material in which a discontinuous fiber is two-dimensionally randomly arranged, tensile modulus in two directions crossing at a right angle each other in the plane is measured and a larger value of the obtained values of the tensile modulus is divided by a smaller value thereof and the resulting ratio becomes 2 or less.

The discontinuous fiber constituting the random carbon-fiber composite material is specifically a short fiber having a fiber length of 0.1 to less than 10 mm or a long fiber having a fiber length of 10 mm to 100 mm. In the case of the discontinuous fiber, a form of a paper made using chopped strands or the like or a two-dimensional random mat is preferred. Of these, it is preferred to be a form of a random mat in which the carbon fiber includes a discontinuous carbon fiber having a fiber length of 10 to 100 mm and the carbon fiber is substantially orientated two-dimensionally randomly with fiber areal weight of 25 to 3,000 g/m$^2$. Furthermore, preferred is a random mat in which a degree of fiber opening of the carbon fiber in the thermoplastic resin matrix is controlled and which contains the carbon fiber as a carbon fiber bundle having a specific number or more of carbon fibers and opened carbon fibers other than the bundle in a specific ratio.

The random mat can be preferably obtained through the following steps:
1. a step of cutting the carbon fiber bundle (cutting step),
2. a step of introducing the cut carbon fiber in a tube and opening the fiber bundle by applying air to the fiber (fiber opening step),
3. a step of spraying the carbon fiber and a thermoplastic resin at the same time, simultaneously with diffusing the opened carbon fiber, while sucking the opened carbon fiber together with the thermoplastic resin in a particle-shape or a fiber-shape, and
4. a step of fixing the sprayed carbon fiber and thermoplastic resin (fixing step), and a random carbon-fiber composite material can be obtained by thermally shaping the random mat. Incidentally, in the above spraying step, when the suction is thoroughly performed, the carbon fiber and the thermoplastic resin are fixed, so that the fixing step can be omitted in that case.

[Layer Body]

The composite material in the vehicle skeleton member of the invention is the unidirectional carbon-fiber composite material (A) in which a continuous fiber is aligned in one direction and/or the form of the carbon fiber in the composite material is a random carbon-fiber composite material (B) in which a discontinuous fiber is two-dimensionally randomly arranged, but they are preferably used in a form of a layer body using them as a base layer. Namely, the invention includes a vehicle skeleton member having a layer body of the unidirectional carbon-fiber composite material (A) and/or a layer body of the random carbon-fiber composite material (B).

Specific examples of the layer body of the unidirectional carbon-fiber composite material (A) include a layer body of a plurality of the unidirectional carbon-fiber composite materials (A), and a layer body of the unidirectional carbon-fiber composite material (A) and at least one layer selected from the group consisting of the random carbon-fiber composite material (B), a composite material (C) of an organic fiber and a thermoplastic resin (hereinafter sometimes referred to as "organic fiber thermoplastic resin composite material C"), a composite material of a glass fiber and a thermoplastic resin, and a neat thermoplastic resin layer.

Of these, there may be preferably exemplified a sandwiched member having the unidirectional carbon-fiber composite material (A) as a skin layer and the random carbon-fiber composite material (B) as a core member (hereinafter sometimes referred to as sandwich AB) and a sandwich member having the unidirectional carbon-fiber composite material (A) as a skin layer and the composite material (C) of an organic fiber and a thermoplastic resin as a core member (hereinafter sometimes referred to as sandwich AC).

Specific examples of the layer body of the random carbon-fiber composite material (B) include a layer body of a plurality of the random carbon-fiber composite materials (B), and a layer body of the random carbon-fiber composite material (B) and at least one layer selected from the group consisting of the unidirectional carbon-fiber composite material (A), the composite material (C) of an organic fiber and a thermoplastic resin, the composite material of a glass fiber and a thermoplastic resin, and the neat thermoplastic resin layer.

Of these, there may be preferably exemplified a sandwiched material having the random carbon-fiber composite material (B) as a core member and the unidirectional carbon-fiber composite material (A) as a skin layer (the above sandwich AB) and a sandwich material having the random carbon-fiber composite material (B) as a skin layer and the composite material (C) of an organic fiber and a thermoplastic resin as a core member (hereinafter sometimes referred to as sandwich BC).

Figure 6:
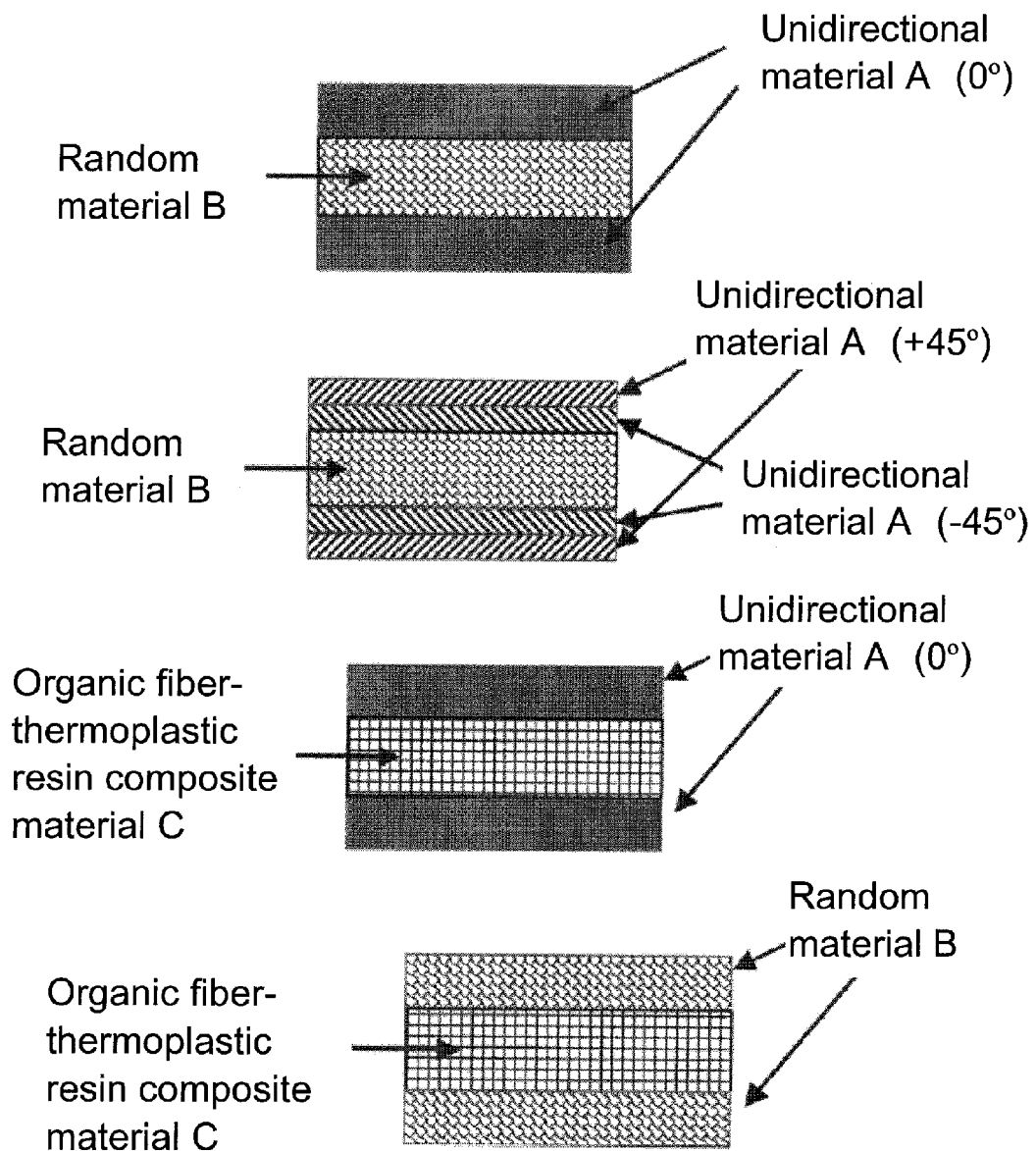
FIG. 6 is a layered example (schematic cross-sectional view) of a sandwiched member.
Figure 7:
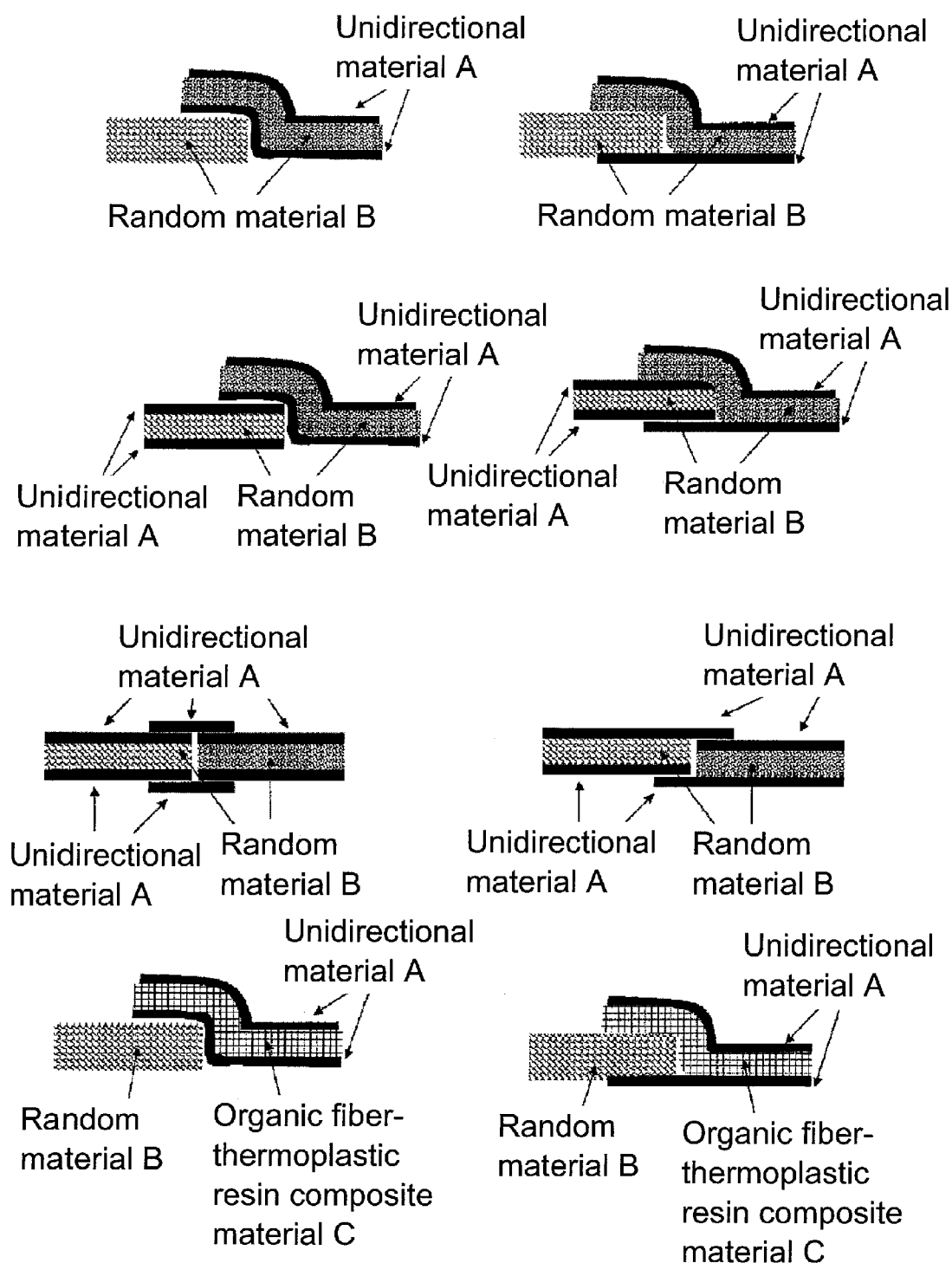
FIG. 7 is a specific example (schematic cross-sectional view) of layering.
Figure 8:
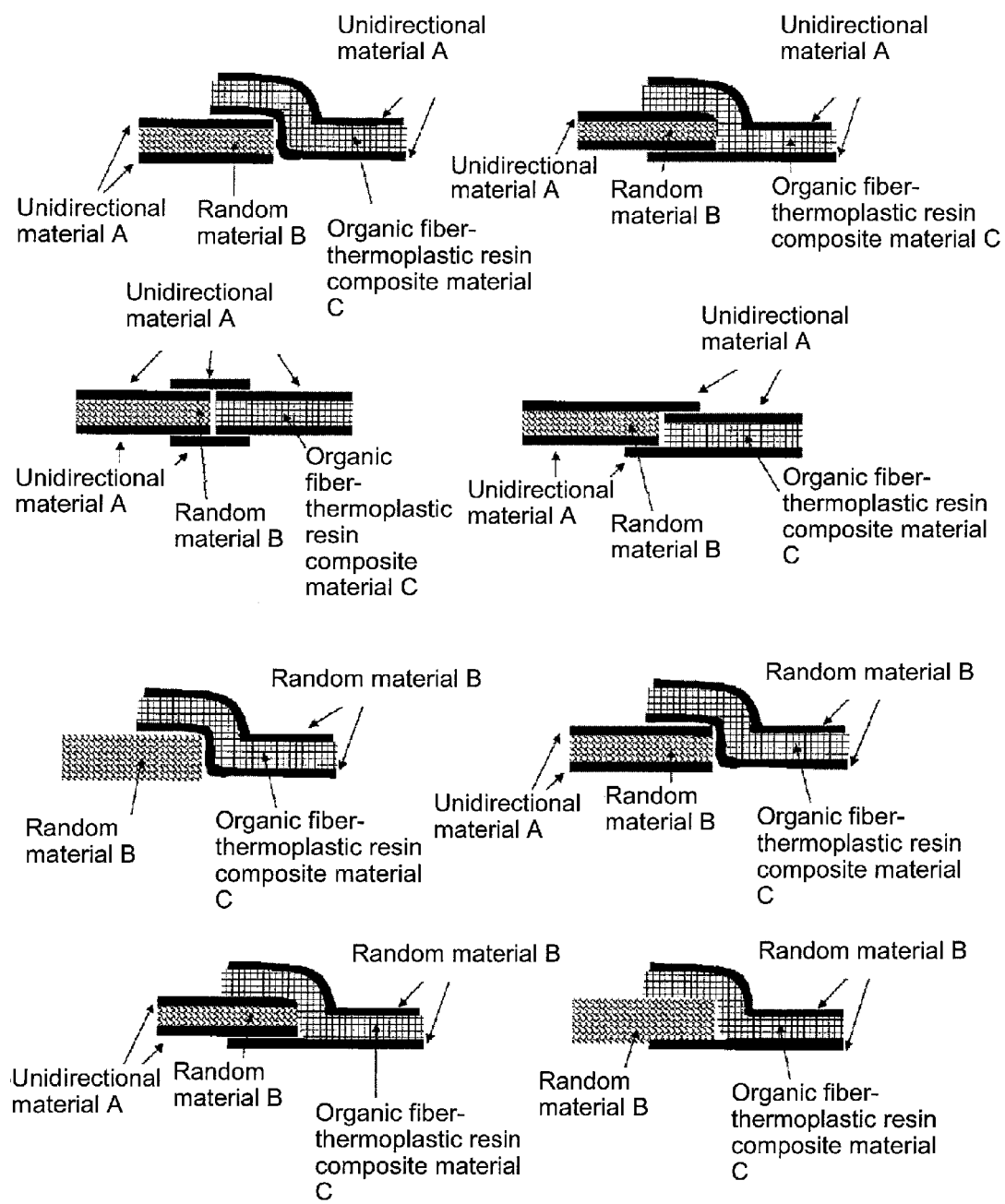
FIG. 8 is a specific example (schematic cross-sectional view) of layering.

A plurality of these layer bodies may be layered and layered examples of sandwiched materials are shown in FIG. 6. The angles in parentheses in the Figure are fiber directions of the unidirectional materials. It is also preferable to layer a plurality of the unidirectional carbon-fiber composite materials (A) and, in that case, they are preferably layered so as to result in plane symmetry. FIG. 7 and FIG. 8 show specific examples in the case of overlapping.

As for the vehicle skeleton member, particularly preferred as a portion to which the layer body of the unidirectional carbon-fiber composite material (A) and the random carbon-fiber composite material (B), especially the sandwiched member having the unidirectional carbon-fiber composite material (A) as a skin layer and the random carbon-fiber composite material (B) as a core member is a particularly strength-requiring component which is arranged in a front and rear direction of a vehicle body and/or a right and left direction of the vehicle body among the vehicle skeleton members. Specifically, the vehicle skeleton member is a reinforcing structural part to be arranged at one or more selected from the group consisting of an underfloor structural component, an upperfloor structural component, a side sill structural component, a vehicle body upper structural component, and the like but can be used without particular limitation.

As for the vehicle skeleton member, particularly preferred as a portion to which the layer body of the unidirectional carbon-fiber composite material (A) and the composite material (C) of an organic fiber and a thermoplastic resin, especially the sandwiched material having the unidirectional carbon-fiber composite material (A) as a skin layer and the composite material (C) of an organic fiber and a thermoplastic resin as a core member is a component for which performance of both of a reinforcing structure and an impact-absorbing structure is required among the vehicle skeleton members. Specifically, the vehicle skeleton member is one or more selected from the group consisting of an outer plate part of the underfloor structural component, a room-side reinforcing structural part of the upperfloor structural component, the side sill structural component, and a roof rail of the vehicle body upper structural component, and the like but can be used without particular limitation.

As for the vehicle skeleton member, particularly preferred as a portion to which the layer body of the random carbon-fiber composite material (B) and the composite material (C) of an organic fiber and a thermoplastic resin, especially the sandwiched member having the random carbon-fiber composite material (B) as a skin layer and the composite material (C) of an organic fiber and a thermoplastic resin as a core member is a component having a complex shape, of which an impact-absorbing structure is required. Specifically, the vehicle skeleton member is one or more selected from the group consisting of a bulkhead part of the upperfloor structural component, a floor part, an outer plate part of the side sill structural component, an outer plate part of pillar of the vehicle body upper structural component, and the like but can be used without particular limitation.

[Composite Material (C) of Organic Fiber and Thermoplastic Resin]

The following will describe the composite material (C) of an organic fiber and a thermoplastic resin to be used as a core member of the sandwiched material.

The organic fiber includes one or more selected from the group consisting of para- or meta-aramide fibers, polyethylene terephthalate, polyethylene naphthalate, and the like. As the thermoplastic resin that is a matrix, the same ones as in the above carbon fiber composite material are used. The form of the organic fiber in the composite material includes woven fabrics, knitted goods, nonwoven fabrics, unidirectional materials, or random materials of discontinued fibers.

Since the sandwiched material having the composite material (C) of the organic fiber and the thermoplastic resin as a core member can prevent parts from protruding to passengers upon impact or can absorb the impact, it is preferred to arrange the sandwiched material at a floor structural component, a side sill structural component, a place near to a living space among the vehicle body upper structural components such as pillar and roof, an outer plate part of the vehicle body structural component, and the like. In addition, the sandwiched material is preferably arranged at caps of a battery box.

[Other Arbitrary Component]

The composite materials constituting the vehicle skeleton member of the invention may contain non-carbon inorganic fibers such as glass fibers, boron fibers, or alumina fibers, fillers that are not fibrous, various additives such as an antioxidant unless they hinder the object of the invention, in addition to the aforementioned carbon fibers and organic fibers.

[Embodiment of Vehicle Skeleton Member of the Invention]

Specific examples of the embodiment of the vehicle skeleton member of the invention will be explained with reference to FIG. 1 to FIG. 8. The components in the figures are constituted by the composite material of a thermoplastic resin and a carbon fiber but may contain member(s) having a material other than the composite material of a thermoplastic resin and a carbon fiber as mentioned above. Incidentally, with regard to the following FIGS. 1 to 8, the average fiber diameter of the carbon fiber used is 7 μm unless otherwise stated.

FIG. 1 is a schematic view of a structural component in the case where the vehicle skeleton member is a double-deck type one. A vehicle skeleton member 1 to be assembled by joining is manufactured from an underfloor structural component 2, an upper floor structural component 3, side sill structural components constituted by right one and left one 4RH, 4LH, and a vehicle body upper structural component 5 such as pillar and roof.

Figure 2:
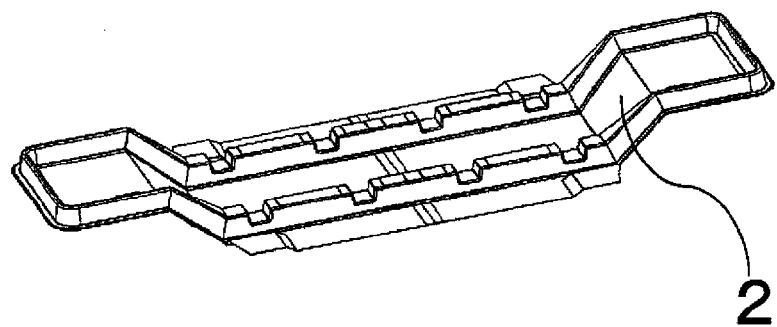
FIG. 2 is a schematic view of an underfloor structural component.
Figure 2:
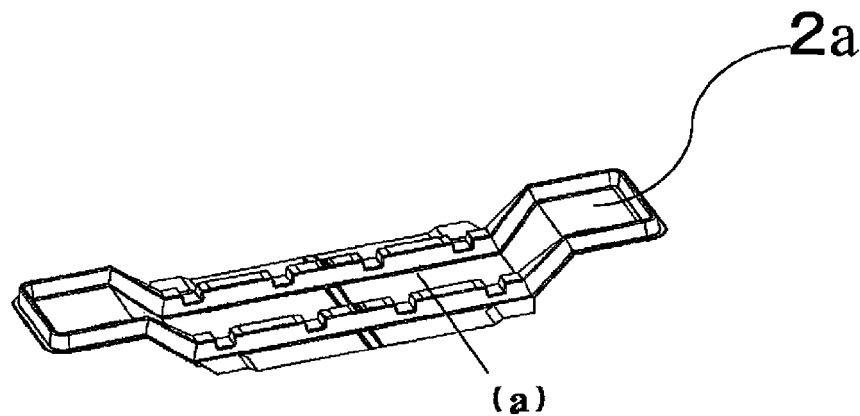
Figure 2:
Figure 2:
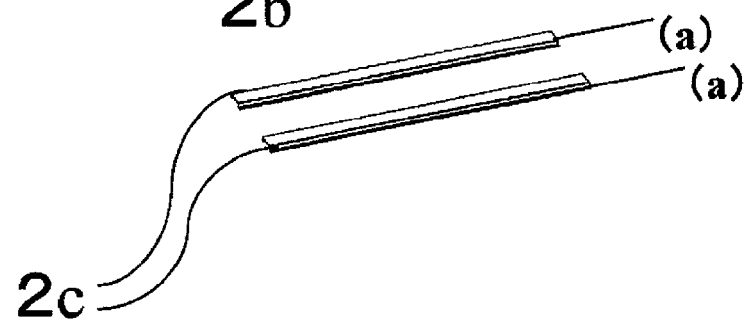

FIG. 2 is a schematic view in the case where the vehicle skeleton member to be assembled by joining is the underfloor structural component. For obtaining the underfloor structural component 2, it can be manufactured by first joining a component 2b and a component 2c and joining the thus obtained component to the lower side of 2a. The portion shown by —(a) in the figure uses a sandwiched material (thickness: 1.6 mm) having a unidirectional carbon-fiber composite material (A) as a skin layer (thickness: 0.3 mm, weight content of carbon fiber: 50% by weight, Nylon 6 resin is used) and a random carbon-fiber composite material (B) as a core member (thickness: 1.0 mm, carbon fiber length: 20 mm, weight content of carbon fiber: 40% by weight, Nylon 6 resin is used). The other portions contains a random carbon-fiber composite material (B) having Nylon 6 resin and having a carbon fiber length of 20 mm, a fiber weight content of 45% by weight, and a thickness of 1.6 mm singly.

Figure 3:
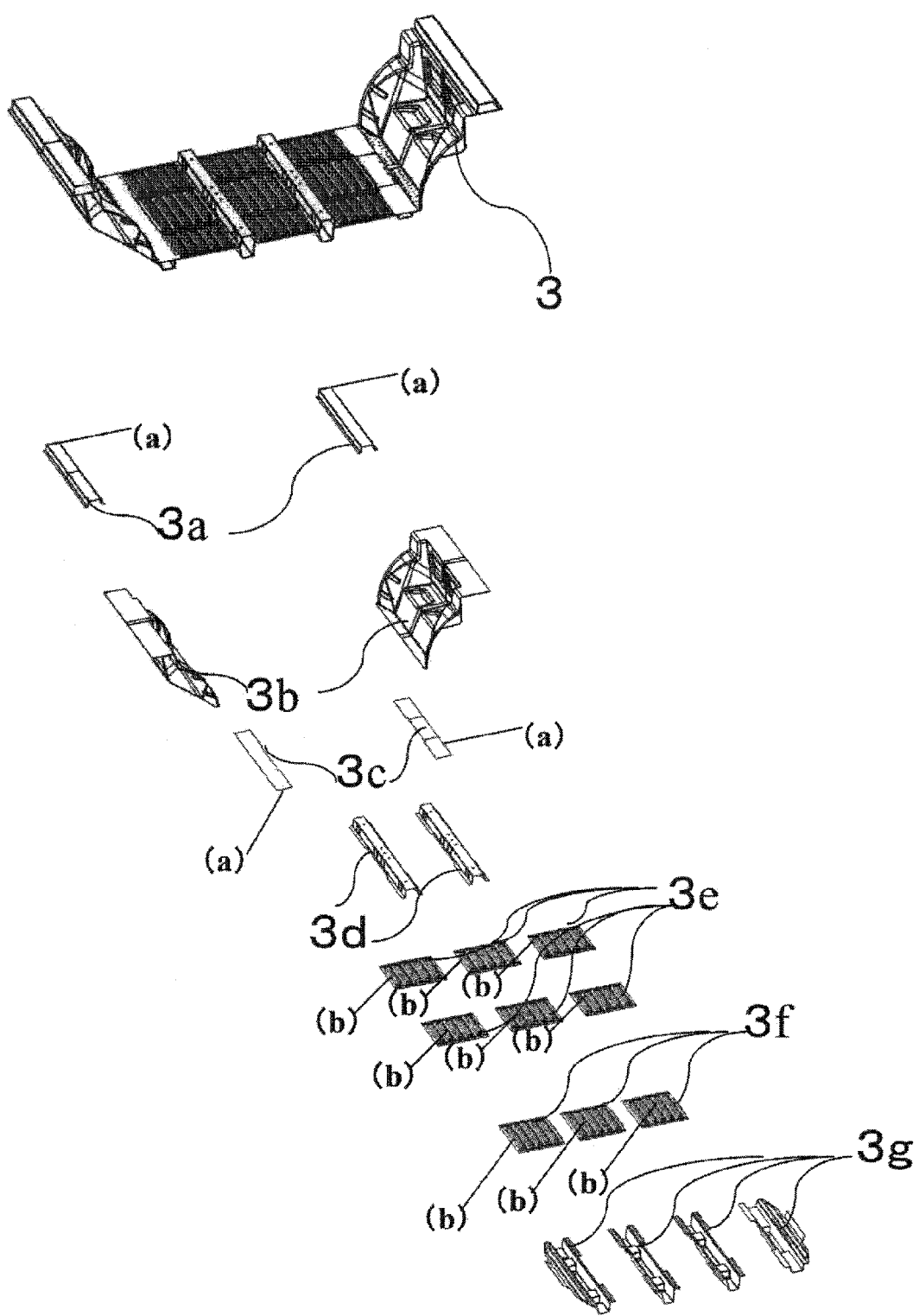
FIG. 3 is a schematic view of an upperfloor structural component.

FIG. 3 is a schematic view in the case where the vehicle skeleton member to be assembled by joining is the upperfloor structural component. For obtaining the upperfloor structural component 3, it can be manufactured by joining a component 3a, a component 3b, a component 3c, a component 3d, a component 3e, a component 3f, and a component 3g. The portion shown by —(a) in the figure uses a sandwiched material (thickness: 1.6 mm) having a unidirectional carbon-fiber composite material (A) as a skin layer (thickness: 0.3 mm, weight content of carbon fiber: 50% by weight, Nylon 6 resin is used) and a random carbon-fiber composite material (B) as a core member (thickness: 1.0 mm, carbon fiber length: 20 mm, weight content of carbon fiber: 40% by weight, Nylon 6 resin is used). The portion shown by —(b) in the figure uses a sandwiched material (thickness: 1.6 mm) having a random carbon-fiber composite material (B) as a skin layer (thickness: 0.5 mm, carbon fiber length: 20 mm, weight content of carbon fiber: 45% by weight, Nylon 6 resin is used) and a composite material (C) of an organic fiber and a thermoplastic resin as a core material (thickness: 0.6 mm, polyester plain weave fabric, weight content of polyester fiber: 50% by weight, Nylon 6 resin is used). The other portions contain a random carbon-fiber composite material (B) having Nylon 6 resin and having a carbon fiber length of 20 mm, a fiber weight content of 45% by weight, and a thickness of 1.6 mm singly.

Figure 4:
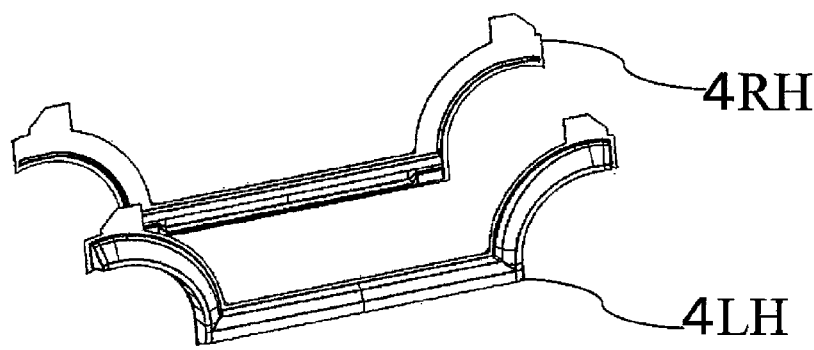
FIG. 4 is a schematic view of a side sill structural component.
Figure 4:
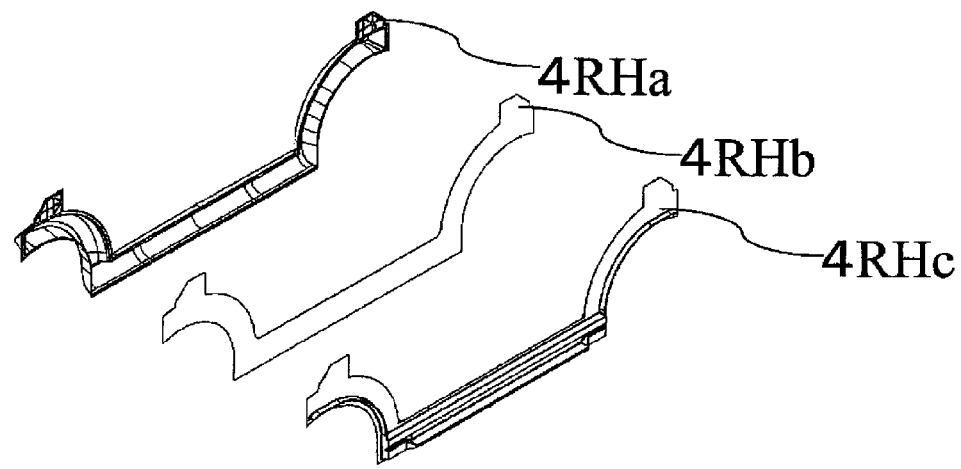
Figure 4:
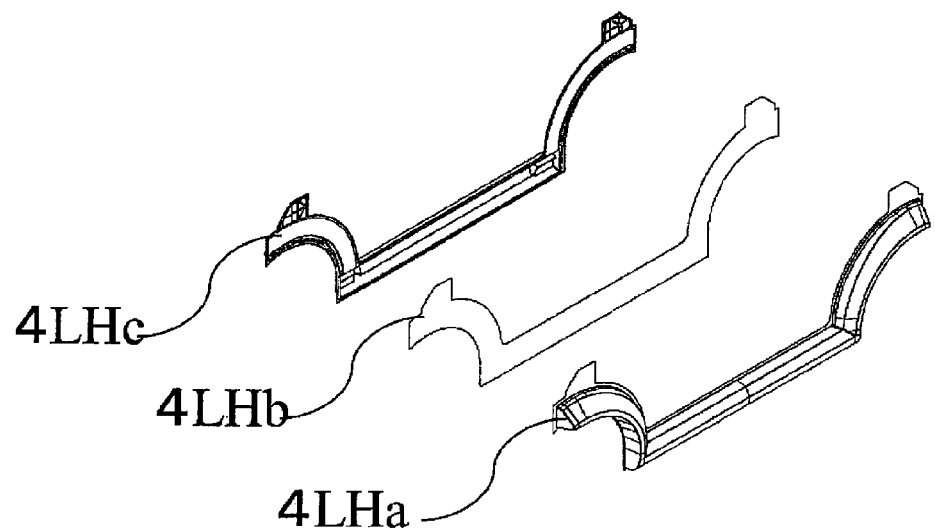

FIG. 4 is a schematic view in the case where the vehicle skeleton member to be assembled by joining is the side sill structural component. For obtaining side sill structural components including right one and left one 4RH and 4LH, 4RH is manufactured by joining a component 4RHa and components 4RHb and 4RHc and similarly 4LH is manufactured by joining a component 4LHa and components 4LHb and 4LHc. They contain a random carbon-fiber composite material (B) having Nylon 6 resin and having a carbon fiber length of 20 mm, a fiber weight content of 45% by weight, and a thickness of 1.6 mm singly.

Figure 5:
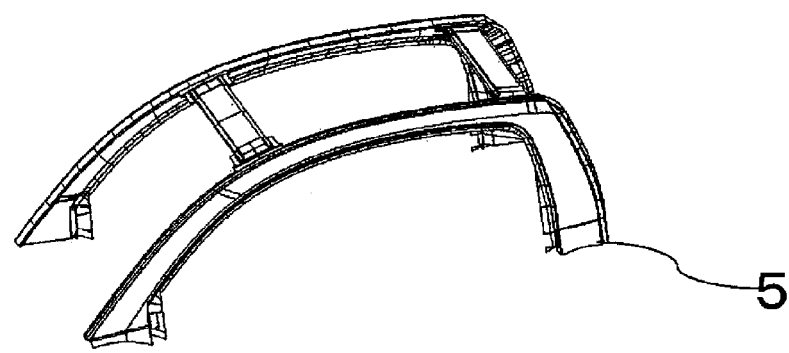
FIG. 5 is a schematic view of a vehicle body upper structural component.
Figure 5:
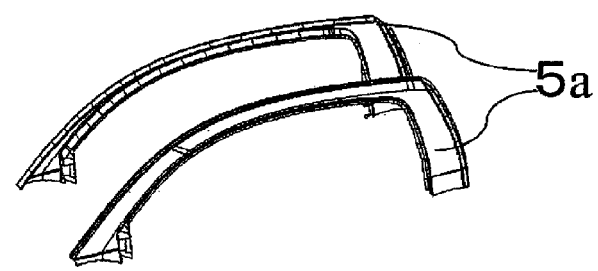
Figure 5:
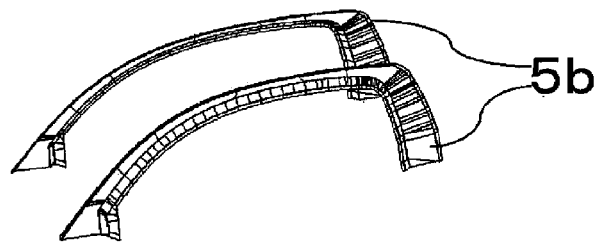
Figure 5:
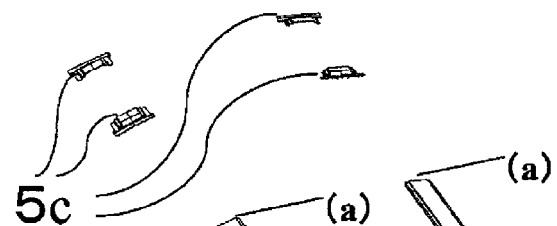
Figure 5:
Figure 5:
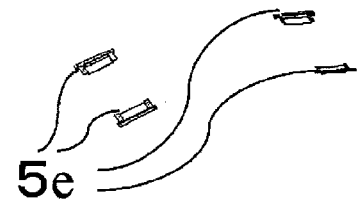

FIG. 5 is a schematic view in the case where the vehicle skeleton member to be assembled by joining is the vehicle body upper structural component such as pillar and roof. For obtaining the vehicle body upper structural component 5, it can be manufactured by joining a component 5a, a component 5b, a component 5c, a component 5d, and a component 5e. The portion shown by —(a) in the figure uses a sandwiched member (thickness: 1.6 mm) having a unidirectional carbon-fiber composite material (A) as a skin layer (thickness: 0.3 mm, weight content of carbon fiber: 50% by weight, polypropylene resin is used) and a random carbon-fiber composite material (B) as a core material (thickness: 1.0 mm, carbon fiber length: 20 mm, weight content of carbon fiber: 40% by weight, polypropylene resin is used). Portions other than the joint component 5c and the component 5e use a random carbon-fiber composite material (B) having polypropylene resin and having a carbon fiber length of 20 mm, a fiber weight content of 45% by weight, and a thickness of 1.6 mm singly.

FIG. 6 is cross-sectional schematic views of layering examples of various sandwiched materials applicable to the vehicle skeleton member of the invention, which show:

a layering example in which the skin layer is a unidirectional carbon-fiber composite material (A) of 0° and the core layer is a random carbon-fiber composite material (B), a layering example in which the skin layer is unidirectional carbon-fiber composite materials (A) of +45°/–45° and the core layer is a random carbon-fiber composite material (B), a layering example in which the skin layer is a unidirectional carbon-fiber composite material (A) of 0° and the core layer is a composite material (C) of an organic fiber and a thermoplastic resin, and a layering example in which the skin layer is a random carbon-fiber composite material (B) and the core layer is a composite material (C) of an organic fiber and a thermoplastic resin, in this order from the top. Here, the angle such as "0°" in the case of "unidirectional carbon-fiber composite material (A) of 0°" is an angle of the carbon fiber (continuous fiber) in the unidirectional carbon-fiber composite material (A) to a standard direction determined for convenience in the design and handling of members constituted by the unidirectional carbon-fiber composite material (A) among the vehicle skeleton members of the invention, and is expressed by a numerical value in the range of larger than –90° to 90° or smaller.

FIG. 7 and FIG. 8 are cross-sectional schematic views of specific examples of various layer structures applicable to cases where the vehicle skeleton member of the invention is constituted by the layer body. In this regard, in the case where the vehicle skeleton member of the invention is constituted by the layer body, and a layer of the unidirectional carbon-fiber composite material (A), a layer of the random carbon-fiber composite material (B), or a layer of the composite material (C) of an organic fiber and a thermoplastic resin is included plurally in the layer body, individual layers may be the completely same composite material or may be constituted by a plurality of kinds of layers different in composition, for example, a plurality of kinds of layers which meet the random carbon-fiber composite material (B) but are different in content of the carbon fiber or different in the thermoplastic resin that is a matrix component.

INDUSTRIAL APPLICABILITY

The vehicle skeleton member of the invention is suitable for formation of vehicle skeletons for automobiles and thus enables production of automobiles that are light in weight and also excellent in body strength.

The invention claimed is:

1. A vehicle skeleton member comprising a composite material of a thermoplastic resin and a carbon fiber,
wherein the composite material is a random carbon-fiber composite material (B) that a form of the carbon fiber in the composite material is a discontinuous fiber arranged two-dimensionally randomly, wherein tensile moduli in two directions crossing at a right angle to each other within a plane is such that a ratio obtained by dividing a larger value of tensile modulus by a smaller value of tensile modulus is 2 or less.

2. The vehicle skeleton member according to claim 1,
wherein the vehicle skeleton member is at least one selected from the group consisting of an underfloor structural component, an upperfloor structural component, a side sill structural component, and a vehicle body upper structural component.

3. The vehicle skeleton member according to claim 1,
wherein the vehicle skeleton member is at least one selected from the group consisting of a reinforcing structural part arranged on an underfloor structural component, an upperfloor structural component, a side sill structural component, and a vehicle body upper structural component.

4. The vehicle skeleton member according to claim 1,
wherein the vehicle skeleton member is an upperfloor structural component, an underfloor structural component, or a side sill structural component, and
the thermoplastic resin in the composite material is an aliphatic polyamide.

5. The vehicle skeleton member according to claim 1,
wherein the vehicle skeleton member is a vehicle body upper structural component, and
the thermoplastic resin in the composite material is a polyolefin.

6. The vehicle skeleton member according to claim 1, wherein the composite material includes a layer body of a plurality of random carbon-fiber composite materials (B).

7. The vehicle skeleton member according to claim 1, wherein the composite material includes a layer body of the random carbon-fiber composite material (B) and a unidirectional carbon-fiber composite material (A) that a form of the carbon fiber in the composite material (A) is a continuous fiber aligned in one direction is partially used as the composite material.

8. The vehicle skeleton member according to claim 1, wherein the composite material is sandwiched material having the random carbon-fiber composite material (B) as a core member and a unidirectional carbon-fiber composite material (A) that a form of the carbon fiber in the composite material (A) is a continuous fiber aligned in one direction as a skin layer.

\* \* \* \* \*